United States Patent
Mishra (10) Patent No.: US 8,266,062 B2
(45) Date of Patent: Sep. 11, 2012

(54) SERVER SIDE REVERSIBLE HASH FOR TELEPHONE-BASED LICENSING MECHANISM

(75) Inventor: Prashant Mishra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 11/769,210

(22) Filed: Jun. 27, 2007

(65) Prior Publication Data

US 2009/0006260 A1   Jan. 1, 2009

(51) Int. Cl.
*G06F 21/00* (2006.01)

(52) U.S. Cl. ................ 705/59; 705/50; 705/51

(58) Field of Classification Search .............. 705/50–51, 705/59
See application file for complete search history.

(56) References Cited

U.S. PATENT DOCUMENTS

| | | | | |
|---|---|---|---|---|
| 5,666,415 | A * | 9/1997 | Kaufman | 713/159 |
| 5,768,526 | A * | 6/1998 | Fawcett | 709/229 |
| 5,907,618 | A * | 5/1999 | Gennaro et al. | 380/286 |
| 5,920,854 | A * | 7/1999 | Kirsch et al. | 707/3 |
| 5,946,679 | A * | 8/1999 | Ahuja et al. | 707/3 |
| 6,070,158 | A * | 5/2000 | Kirsch et al. | 707/3 |
| 6,169,976 | B1 | 1/2001 | Colosso | |
| 6,216,214 | B1 * | 4/2001 | Bryg et al. | 711/207 |
| 6,226,618 | B1 * | 5/2001 | Downs et al. | 705/1 |
| 6,230,231 | B1 * | 5/2001 | DeLong et al. | 711/3 |
| 6,260,141 | B1 | 7/2001 | Park | |
| 6,430,670 | B1 * | 8/2002 | Bryg et al. | 711/216 |
| 6,662,198 | B2 * | 12/2003 | Satyanarayanan et al. | 707/204 |
| 6,672,505 | B1 * | 1/2004 | Steinmetz et al. | 235/379 |
| 6,675,163 | B1 * | 1/2004 | Bass et al. | 707/6 |
| 6,853,988 | B1 * | 2/2005 | Dickinson et al. | 705/75 |
| 6,892,206 | B2 * | 5/2005 | Dharap | 707/101 |
| 6,928,162 | B1 * | 8/2005 | Heddes et al. | 380/28 |
| 6,928,428 | B1 * | 8/2005 | De Vries | 707/3 |
| 6,993,664 | B2 * | 1/2006 | Padole et al. | 705/59 |
| 7,093,130 | B1 * | 8/2006 | Kobayashi et al. | 713/176 |
| 7,116,664 | B2 * | 10/2006 | Davis et al. | 370/392 |
| 7,120,630 | B2 * | 10/2006 | Bass et al. | 707/6 |

(Continued)

FOREIGN PATENT DOCUMENTS

EP   1533676 A1   5/2005

OTHER PUBLICATIONS

"Invert." Webster's Third New International Dictionary, Unabridged, Merriam-Webster, Incorporated., 1993. [online][retrieved on Jul. 23, 2009]. Retrieved from: < http://lionreference.chadwyck.com/searchFulltext.do?id=17960965&idType=offset&divLevel=2&queryId=../session/1248378999_1923&area=mwd&forward=refshelf&trail=refshelf.>.*

(Continued)

*Primary Examiner* — Mamon Obeid
*Assistant Examiner* — Monica Mandel
(74) *Attorney, Agent, or Firm* — Vierra Magen Marcus & DeNiro LLP (57) ABSTRACT

A system and method are disclosed relating to authenticating software licenses associated with a software product. During an installation process, a purchaser of a software product may contact a vendor representative via a telephone connection and verbally relay a data packet, which may be an installation ID. The vendor server creates a reversible hash from the data packet, a known seed value and additional information relating to the software product or license. The server encrypts the hash to generate a confirmation ID, and sends the confirmation ID to the software product purchaser.

10 Claims, 9 Drawing Sheets

U.S. PATENT DOCUMENTS

| | | | |
|---|---|---|---|
| 7,139,753 B2 * | 11/2006 | Bass et al. | 707/4 |
| 7,155,500 B2 * | 12/2006 | Nikander | 709/223 |
| 7,171,662 B1 | 1/2007 | Misra et al. | |
| 7,187,771 B1 * | 3/2007 | Dickinson et al. | 380/228 |
| 7,216,236 B2 * | 5/2007 | Kou et al. | 713/183 |
| 7,260,724 B1 * | 8/2007 | Dickinson et al. | 713/182 |
| 7,281,205 B2 * | 10/2007 | Brook | 715/237 |
| 7,349,397 B2 * | 3/2008 | Davis et al. | 370/392 |
| 7,386,486 B2 * | 6/2008 | Fujishige et al. | 705/26 |
| 7,391,865 B2 * | 6/2008 | Orsini et al. | 380/201 |
| 7,413,085 B2 * | 8/2008 | Zager et al. | 209/206 |
| 7,422,115 B2 * | 9/2008 | Zager et al. | 209/206 |
| 7,434,058 B2 * | 10/2008 | Ahuja et al. | 713/177 |
| 7,457,955 B2 * | 11/2008 | Seshadri et al. | 713/170 |
| 7,461,406 B2 * | 12/2008 | Pelly et al. | 726/27 |
| 7,475,254 B2 * | 1/2009 | Craft | 713/187 |
| 7,487,213 B2 * | 2/2009 | Zager et al. | 709/206 |
| 7,490,241 B1 * | 2/2009 | Peyravian et al. | 713/178 |
| 7,490,245 B2 * | 2/2009 | Waltermann et al. | 713/189 |
| 7,506,161 B2 * | 3/2009 | Mizrah | 713/168 |
| 7,519,824 B1 * | 4/2009 | Peyravian et al. | 713/178 |
| 7,522,751 B2 * | 4/2009 | White et al. | 382/115 |
| 7,529,944 B2 * | 5/2009 | Hamid | 713/186 |
| 2002/0120726 A1 * | 8/2002 | Padole et al. | 709/222 |
| 2003/0149881 A1 * | 8/2003 | Patel et al. | 713/186 |
| 2004/0093599 A1 | 5/2004 | Reynaud | |
| 2004/0163131 A1 | 8/2004 | Benco | |
| 2007/0067630 A1 | 3/2007 | Lenkov et al. | |
| 2008/0138028 A1 * | 6/2008 | Grady et al. | 386/1 |

OTHER PUBLICATIONS

"Invertible." Webster's Third New International Dictionary, Unabridged, Merriam-Webster, Incorporated., 1993. [online][retrieved on Jul. 23, 2009]. Retrieved from: < http://lionreference.chadwyck.com/searchFulltext.do?id=17964538&idType=offset&divLevel=2&queryId=../session/1248379283_3047&area=mwd&forward=refshelf&trail=refshelf.>.*

"Reverse." Webster's Third New International Dictionary, Unabridged, Merriam-Webster, Incorporated., 1993. [online][retrieved on Jul. 23, 2009]. Retrieved from: < http://lionreference.chadwyck.com/search Fulltext.do?id=29513070&idType=offset&divLevel=2&queryId=../session/1248379506_3949&area=mwd&forward=refshelf&trail=refshelf.>.*

"Reversible." Webster's Third New International Dictionary, Unabridged, Merriam-Webster, Incorporated., 1993. [online][retrieved on Jul. 23, 2009]. Retrieved from: < http://lionreference.chadwyck.com/search Fulltext.do?id=29519586&idType=offset&divLevel=2&queryId=../session/1248379754_4870&area=mwd&forward=refshelf&trail=refshelf.>.*

An Introduction to Cryptography. Network Associates Inc., 1990-2000. pp. 1-86.*

Mobile Software Licensing https://www.cs.tcd.ie/publications/tech-reports/reports.03/TCD-CS-2003-29.pdf.

Software license management with smart cards, Aura et al., May 10-11, 1999 http://research.microsoft.com/users/tuomaura/Publications/aura-gollmann-smartcard99.pdf.

Bouncer: A Robust and Flexible License Management Service for Avoiding Illegal Use of Software, Brasileiro et al., May 1997 http://www-cse.ucsd.edu/~walfredo/papers/sbes97.ps.

Microsoft Product activation, Microsoft 2007, <retrieved from the Internet Mar. 28, 2007> http://www.microsoft.com/piracy/activation.mspx.

* cited by examiner

502  
504 → Seed = 1100  
      Data = 100001  
506  
   → Hash (Data) {  
        Seed + Data = 1100 + 100001 = 1100100001

Iteration 1:  
510  
512 → Mask = f(Seed+Data) = 10  
    → Shift = g(Seed+Data) = 5  
516  
   → Seed + Data + Mask = 1100100001 + 10 = 1100100011  
520  
   → ResultHash = LeftRotate((Seed + Data + Mask), 5) = 0001111001

Iteration 2:  
528  
   → Mask = f(Seed + Data) = 100  
      Shift = g(Seed + Data) = 2

ResultHash + Mask = 0001111101

ResultHash = LeftRotate((ResultHash), 2) = 0111110100

SERVER SIDE REVERSIBLE HASH FOR TELEPHONE-BASED LICENSING MECHANISM

BACKGROUND

Description of the Related Art

Each year, software piracy drains the U.S. economy of billions of dollars and thousands of skilled high-paying jobs. Technological developments which have made it easier for software manufacturers to provide inexpensive products have also made it easier for software pirates to cheaply replicate and profitably market large volumes of optical media such as CDs and DVDs. This software piracy is also fueling organized crime.

There are many different types of software piracy. A first type is referred to as casual copying, where a customer legitimately purchases software media for installation on a single computer, but then installs it on several computers or loans the media to others for installation on their computer(s). These acts constitute software piracy. In order to protect against such piracy, software licenses are typically required to use a software product legally. Many software vendors prevent software piracy by ensuring the software used by a customer and the accompanying software license are authenticated using a verification process. The verification process generally operates by product activation software as explained below.

Figure 1:
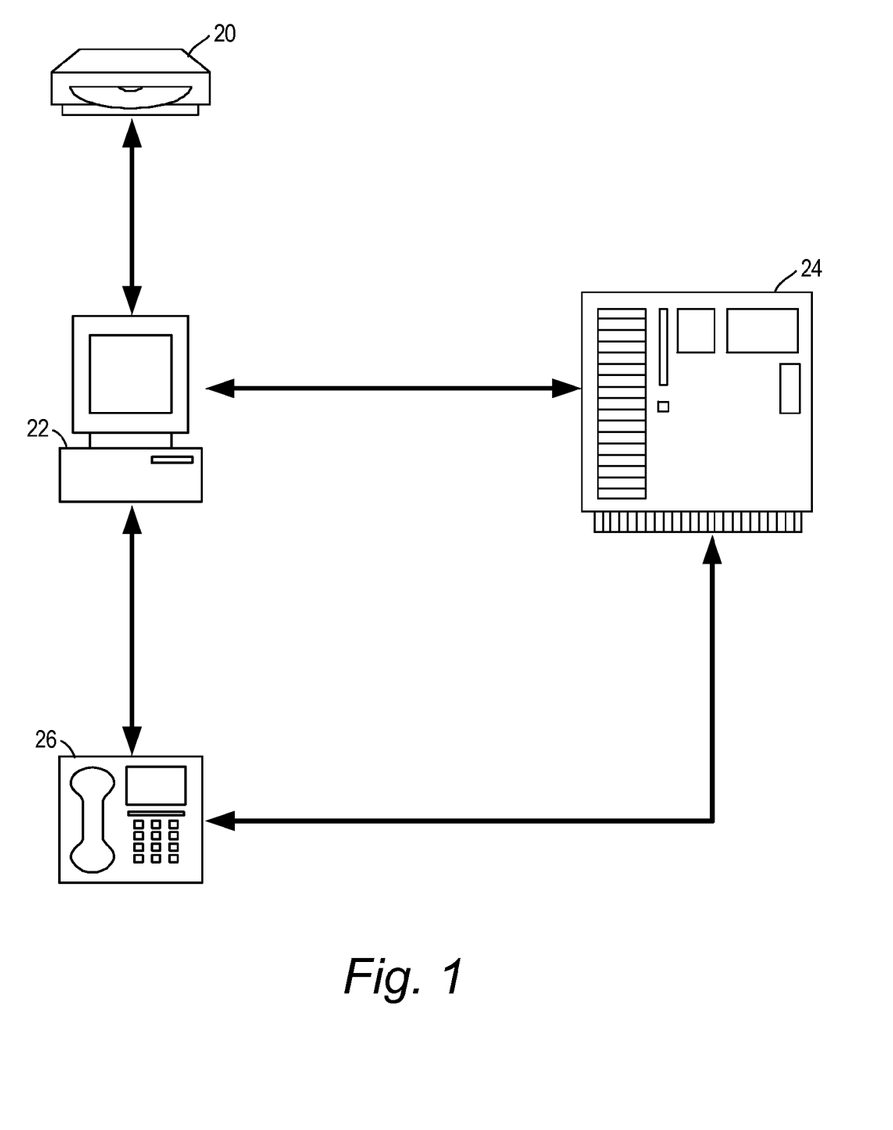
FIG. 1 is a block diagram of conventional components used to activate a software program.

Referring to prior art FIG. 1, there are in general two mechanisms for software product activation: via the Internet or via the telephone. When a user installs software media via a CD reader 20, the media includes an installation program which prompts the user 22 to activate the software via the Internet or by telephone. During Internet activation, certificates are exchanged between the user and an activation verification server 24, of the software manufacturer or license clearing house, to verify authenticity of the media and activate the software product.

If the user opts to activate the software via a telephone 26, the user contacts a customer service representative or interacts with a voice recognition system associated with the activation verification server. The user provides an installation identifier (IID), such as IID 28 in prior art FIG. 2, which is presented to the user over an interface 30 during installation of the software product. The IID 28 may typically be an encrypted number, comprised of different pieces of information. The first piece of the IID may be a product ID and the second piece may be a hardware ID and other licensing related information. The product ID uniquely identifies a unique copy of the software media, and may typically be created from a product key used during the installation of the software product. The hardware ID is generated from various general components of the computer.

Figure 2:
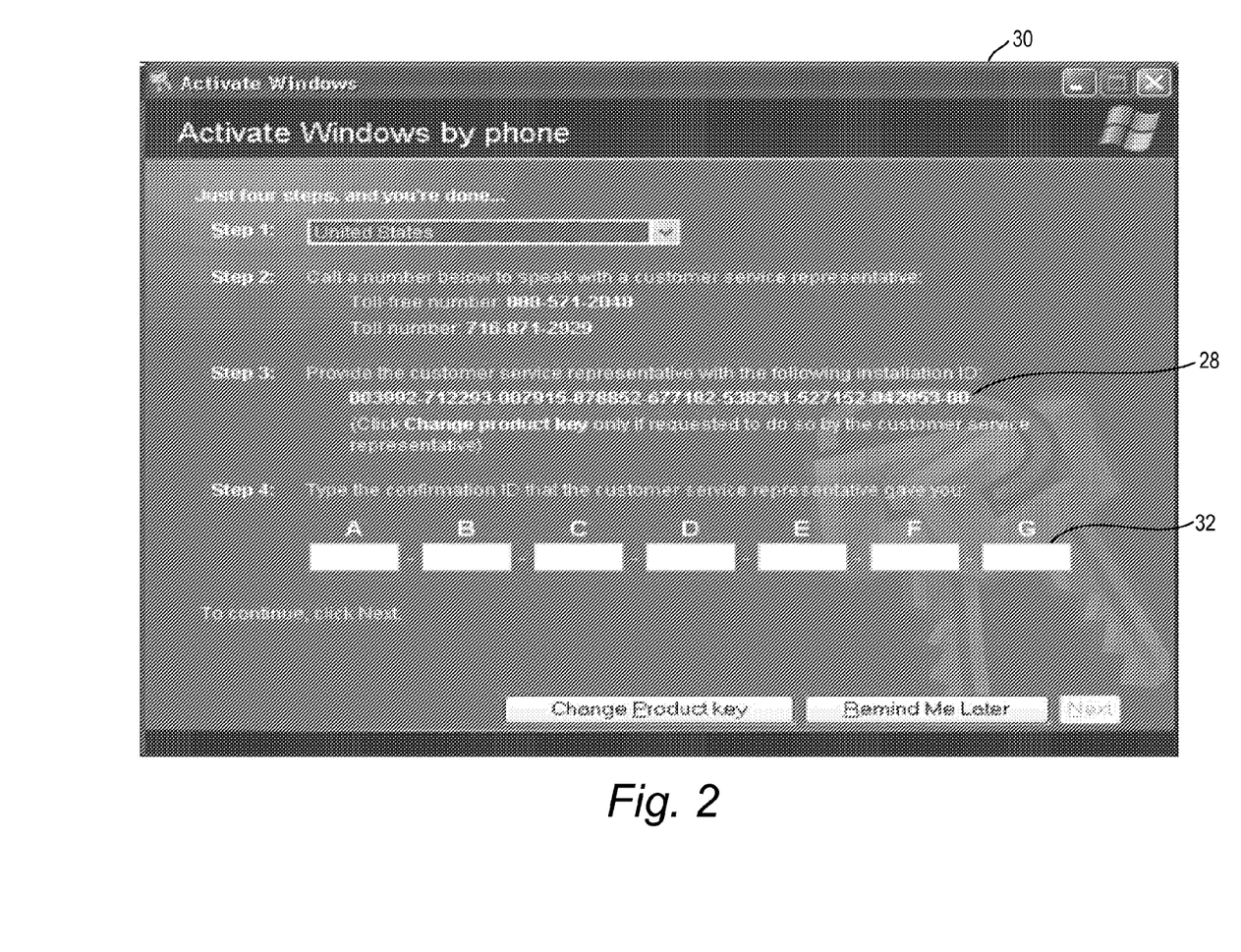
FIG. 2 is a conventional user interface allowing a user to read an IID to a customer service representative in order to receive a confirmation ID for activating a software product.

If the IID 28 is verified by the activation licensing verification server, then a confirmation identifier is given to the user over the telephone to enter in spaces 32 during the installation. Once the confirmation ID is entered, it is decrypted and compared to an ID stored by the installation program. If the IDs match, the software license is valid, the software product is activated and installation may continue. In this way, the IID and confirmation ID serve to deter and prevent software piracy by preventing installation of a software product that violates its license.

Another type of piracy that is known is technical piracy. Technical piracy involves an attempt to derive the confirmation ID or the IID for a software media. It is therefore known to employ various encryption schemes in providing the confirmation ID for distributed media. As technical software pirates are becoming more sophisticated, there is a need for new methodologies for providing the confirmation ID to ensure that software is distributed to and used only by licensed purchasers of software media.

SUMMARY

The described embodiments generally relate to systems and methods to authenticate software telephone licenses using a reversible hash value. A customer may request authorization to activate a software program. The vendor creates a reversible hash from a root data, a known seed value and additional information which may be the license data being authenticated. The reversible hash may be encrypted to generate a confirmation ID, and sends the confirmation ID to the customer. The customer enters the confirmation ID. The customer's computer decrypts and then "reverses" the reversible hash value using the root data and additional information to obtain a determined seed value. The software product the customer wants to install includes the seed value used by the vendor. This known seed value is compared to the determined seed value. If the seed values compare, i.e., are the same, the software and the associated software license is authenticated. The customer is then authorized to use the software.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The present system will now be described with reference to FIGS. 3-9, which roughly described relate to a system for verifying the authenticity of software products via a telephone activation methodology. In general, embodiments of the present system relate to generating a confirmation ID using a reversible hash methodology which is more difficult for software pirates to derive than prior art confirmation IDs.

The confirmation ID is used by a purchaser of a software product in order to activate the software product over the telephone.

Figure 3:
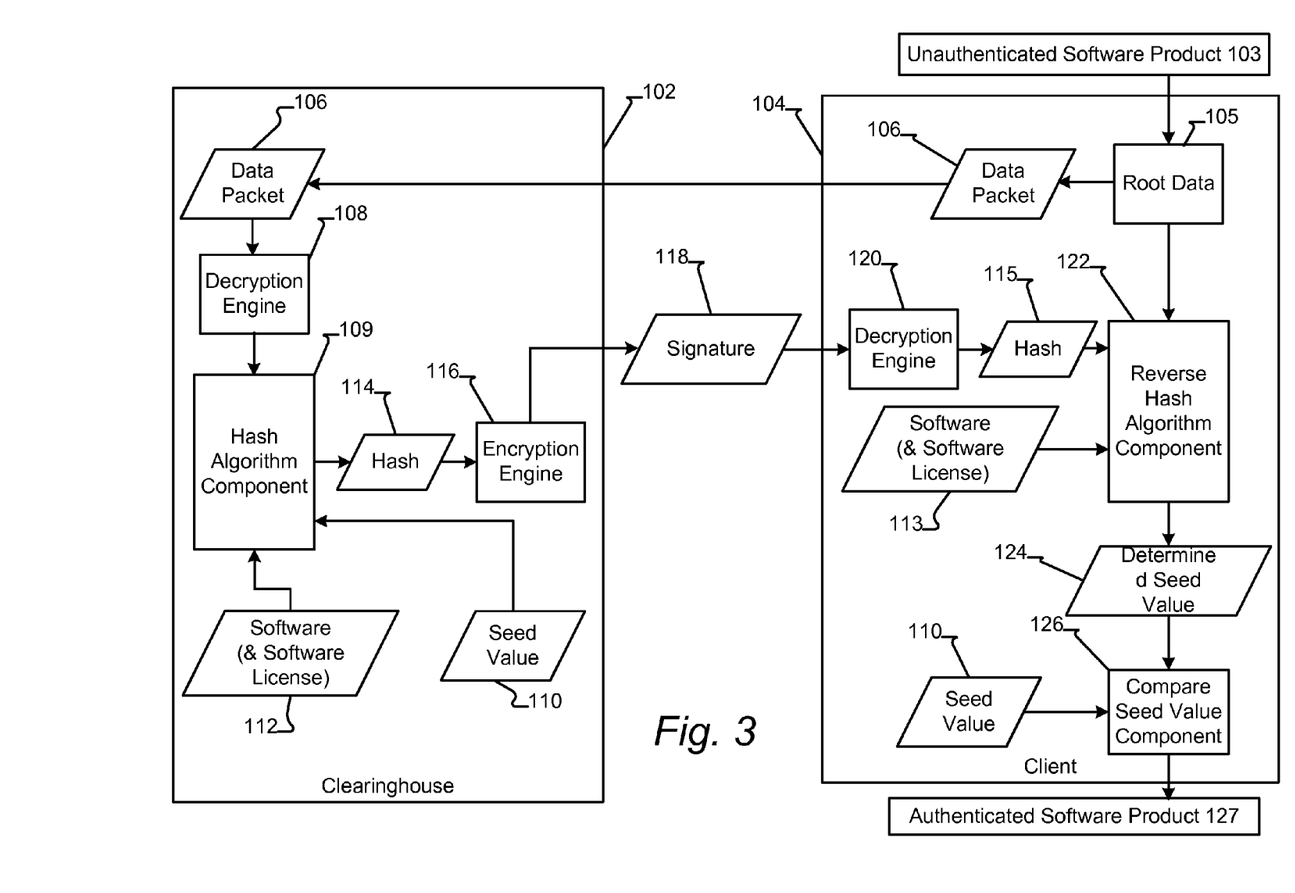
FIG. 3 is a block diagram of an embodiment of a system for reversing the reversible hash of a software license.

Referring initially to the block diagram of FIG. 3, in embodiments, in order to activate a purchased software product (unauthorized software product 103), the software product is launched at a client computing device 100. The software product may typically be loaded into the client device 100 from media such as a CD-ROM, but the software product may be downloaded to the client device 100 over a network such as the Internet in alternative embodiments. Once launched, an installation program included as part of the software product runs, presenting the user with a graphical user interface, which may be for example an interface similar to that shown in prior art FIG. 2. The installation program guides the user through an activation process where the software license for the software product is validated. Embodiments of the present system are directed to an activation process occurring via the telephone. Using the graphical user interface presented by the installation program, the user may indicate his or her intent to activate the software product via the telephone and be given a telephone number of a representative of the software vendor, manufacturer or other representative authorized to activate the software product. Hereinafter, the description of the activation process is described with reference to the software vendor, but it is understood that the process may transpire with any entity authorized to activate the software product. At completion of a successful authentication process as explained below, the method outputs an authenticated software product 127.

During an embodiment of the installation process, an IID is generated and displayed to the user over the graphical user interface over client device 100. The user verbally relays the displayed IID over the telephone to a customer service representative or voice recognition system of the software product vendor. The IID is used along with other information to generate a confirmation ID according to the present system. The confirmation ID is relayed verbally back to the user. If the confirmation ID corresponds to the correct confirmation ID, the software product is activated. The generation of the IID, the confirmation ID and the operation of the activation process are explained in greater detail below.

An embodiment of the present system for generating a confirmation ID at the vendor and reversing the process for extracting the seed value at the client is shown in FIG. 3. The components of the system shown in FIG. 3 can be embodied in software, hardware, or a combination of software and hardware. The system may comprise the client 100 and a clearinghouse 102. In embodiments, the clearinghouse 102 is a server computer at the software vendor's facility, and the client 100 is the customer's computer. Server and client computing systems are described in conjunction with FIG. 9.

The activation process and generation of the confirmation ID begins with transmission of a data packet 106 from the client 100 to the clearinghouse server 102. In embodiments, the data packet is an IID generated as explained below and verbally relayed from a user of client 100 to a customer service representative or voice recognition system associated with clearinghouse 102. However, it is understood that data packet 106 may be information other than the IID, and it is understood that the data packet 106 may be transmitted directly from client 100 via a network such as the Internet in alternative embodiments.

The data packet 106 may comprise information from a variety of sources. In one embodiment, the data packet 106 is generated from root data 105. Root data 105 may be the Product ID (PID) for the software product and a Hardware Identifier (HWID). The PID is unique to the software product being installed and is generated from the product key that is used during installation of the software product. The HWID is generated from various general components of the client system 100. To this, the client may add additional information, such as for example license information relating to the software product. The root data 105 may be the combination of the PID, HWID and the additional information.

It is understood that the root data 105 may be generated by the client from various other or additional sources of information than that described above. These sources of information may include the software product, the company that has preinstalled the software or the ISV that is selling the software, the type or configuration of the computer on which the customer is installing the software, etc.

The root data 105 may then be encrypted by the client, using a public key of the vendor, by any of various known encryption schemes. One or more additional processes may also then be performed on the encrypted root data. These additional processes may include conversion of the encrypted root data to a base-10 encoding and/or the addition of digits to the end of the encrypted root data number string for integrity verification. The result of the above-described operations is the data packet 106 displayed to the user on the client.

In accordance with the present system, the clearinghouse server 102 receives the data packet 106 via telephone communication or otherwise, performs operations on the data packet and then provides the result to a hashing algorithm together with other operands. In embodiments, the operations performed by the server 102 upon receipt of the data packet 106 may restore the number to the root data 105 used by the client to form the data packet 106. In embodiments, these operations may include stripping out the integrity verification digits after verifying the data packet, and converting the result to a binary number. That binary number may then be decrypted in decryption engine 108 using a private key of the vendor. The private key may correspond to the public key used to encrypt the root data 105 at the client. These operations may result in once again obtaining the root data that the client started with.

In embodiments, the root data 105 may be supplied to a hash algorithm component 109. In addition to the root data, a seed value 110 and, in embodiments, one or more additional items of information 112 may also be entered into the hash algorithm component 109. The seed value 110 and information 112 are explained below.

In embodiments, every software product of the same type may have the same predetermined seed value 110, which may be included as part of the software code, software metadata, or other information about the software product. As an example, a predetermined seed value 110 is the hex value "0123456789ABCDEF." In embodiments, the predetermined seed value 110 operates as the first operand in any function the hash algorithm component 109 executes. The predetermined seed value 110, in embodiments, is known to both the clearinghouse 102 and the client 100 because both the clearinghouse 102 and the client 100 store a copy of the software product which includes the predetermined seed value 110 as part of the software code or data.

In embodiments, the one or more items of information 112 input to the hash algorithm component 109 relates in some way to the software program, though it may be otherwise in alternative embodiments. In one embodiment, information 112 may be data from the software or software license. The information 112 may alternatively be a numeric representation of the customer's phone number, which is applied with the seed value 110 to hash algorithm 109 to derive an interim or final reversible hash. In another example, the information 112 is partitioned into portions having a predetermined size, for example, 16 bit portions. The hash algorithm component 109 can then use one or more of the portions of this information to complete functions with the predetermined seed value 110 to create a hash.

The hash algorithm component 109 may use two or more of the three inputs (the root data 105, the seed value 110 and the information 112) in any combination to form hash 114 or interim hash values. Where interim hash values are obtained, algorithm component 109 may then use the interim hash with the third of the three inputs to form the final hash 114. In embodiments, the hash algorithm component 109 executes some predetermined number of functions until a final hash 114 is generated.

In one embodiment, the hash algorithm component 109 uses a modified MD5 message-digest algorithm to create hash 114, wherein the modification may be the addition or elimination of one or more processes, algorithms, or functions used in the MD5, the change in order of the one or more processes, algorithms, or functions used in the MD5, or some other change. The MD5 algorithm is explained in "The MD5 Message-Digest Algorithm" by R. Rivest and published April 1992 as RFC1321 of the Network Working Group of the Internet Engineering Task Force, which document is incorporated herein by reference in its entirety. Other hash algorithms are contemplated. Embodiments of the present invention provide a reversible hash by eliminating one or more of the functions, e.g., an AND logic function, executed by the MD5 algorithm or by executing the one or more functions of the MD5 algorithm over two or more iterations.

In embodiments, once obtained, hash 114 is appended to the root data 105, and the result is supplied to an encryption engine 116, which encrypts the numerical string. In a further embodiment, additional information such as information relating to the software product license may be added to the concatenated result of the root data 105 and hash 114, and then that entire result is supplied to an encryption engine 116, which encrypts the string. The encryption method may be Pretty Good Privacy (PGP) public key encryption, RSA encryption, or a variety of other encryption schemes.

The server then attempts to sign the encrypted data using the private key of the software vendor. This signing may require a check of each bit of the encrypted number, which in embodiments may be 128 bits long. If the encrypted data is successfully signed, the resultant data is the confirmation ID 118, which is sent to the client as explained below. If, after a check of all 128 bits, the signing of the encrypted data string fails, the client is informed that generation of the confirmation ID failed from the supplied data packet.

Assuming the confirmation ID 118 was successfully signed, the clearinghouse 102 communicates the confirmation ID 118 to the client 100. In one embodiment, a vendor customer service representative or voice recognition system communicates the confirmation ID 118 to the customer over a telephone. The customer then enters the confirmation ID 118 into the user interface presented by the installation program on the client computer 100 to activate the software product. In alternative embodiments, the confirmation ID 118 is sent to the client 100 over a network.

In embodiments, the client 100 receives the confirmation ID 118, and performs a reverse of the operations performed at the clearinghouse server 102 to extract the root data, the seed value and the additional information that were supplied to the hash algorithm component 109. In particular, a decryption engine 120 decrypts the confirmation ID 118 to extract the concatenated root data 105 and reversible hash 115. The decryption engine 120 decrypts the confirmation ID 118 using a method or system complimentary to the encryption engine 116. Decrypting the confirmation ID 118 yields the reversible hash 115, which is the same as the reversible hash 114 encrypted by the clearinghouse 102.

The reversible hash 115 may be supplied along with the root data 105 and information 113 to the reverse hash algorithm component 122. Information 113 is taken from the software product being loaded onto client 100. If the software product is legitimate, then the information 113 will be the same information as information 112 supplied by the server 102 to generate hash 114. If, however, the software product is pirated, then the information 113 will not match information 112.

The result of the reverse hash algorithm component 122 is to yield a determined seed value 124. In embodiments, the first function performed by the reverse hash algorithm component 122 is different from the first function performed by the hash algorithm component 109. Indeed, the reverse hash algorithm component 122 executes a first function that reverses or counters the last function performed by the hash algorithm component 109. For example, if the hash algorithm component 109 completed an addition as the last function, the reverse hash algorithm component 122 completes a subtraction, with the same operands, to achieve an interim hash. As such, the reverse hash algorithm component 122 performs one or more counter functions that are associated with, and reverse the one or more functions performed by, the hash algorithm component 109.

After reversing all the functions performed to derive the reversible hash 115, the reverse hash algorithm component 122 outputs a determined seed value 124. As discussed above, in embodiments, the root data 105, seed value 110 and information 112 were supplied to the hash algorithm component 109 to obtain hash 114. The reversible hash algorithm component 122 performs the same net operations as algorithm component 109 in reverse. Accordingly, if the information 113 is the same as information 112, the determined seed value 124 will be the same as the seed value 110. However, if the information 113 is different, i.e., the software product is pirated and/or an incomplete copy of the software, the determined seed value 124 will be different from the seed value 110 because the functions will perform differently at the client 102.

To determine if the determined seed value 124 is the same as seed value 110, the determined seed value is sent to a compare seed value component 126. In embodiments, the compare seed value component 126 compares the numeric value of the determined seed value 124 to the seed value 110. The comparison may be a bit-by-bit comparison, e.g., the bit in position two (2) is the same for both seed values, or a mathematical comparison, for example, subtracting the determined seed value 124 from the seed value 110 to determine if the result is zero. Other comparisons are possible and contemplated. If the determined seed value 124 compares favorably to the seed value 110, the software product is activated and the installation of the software product may continue to completion.

Figure 4:
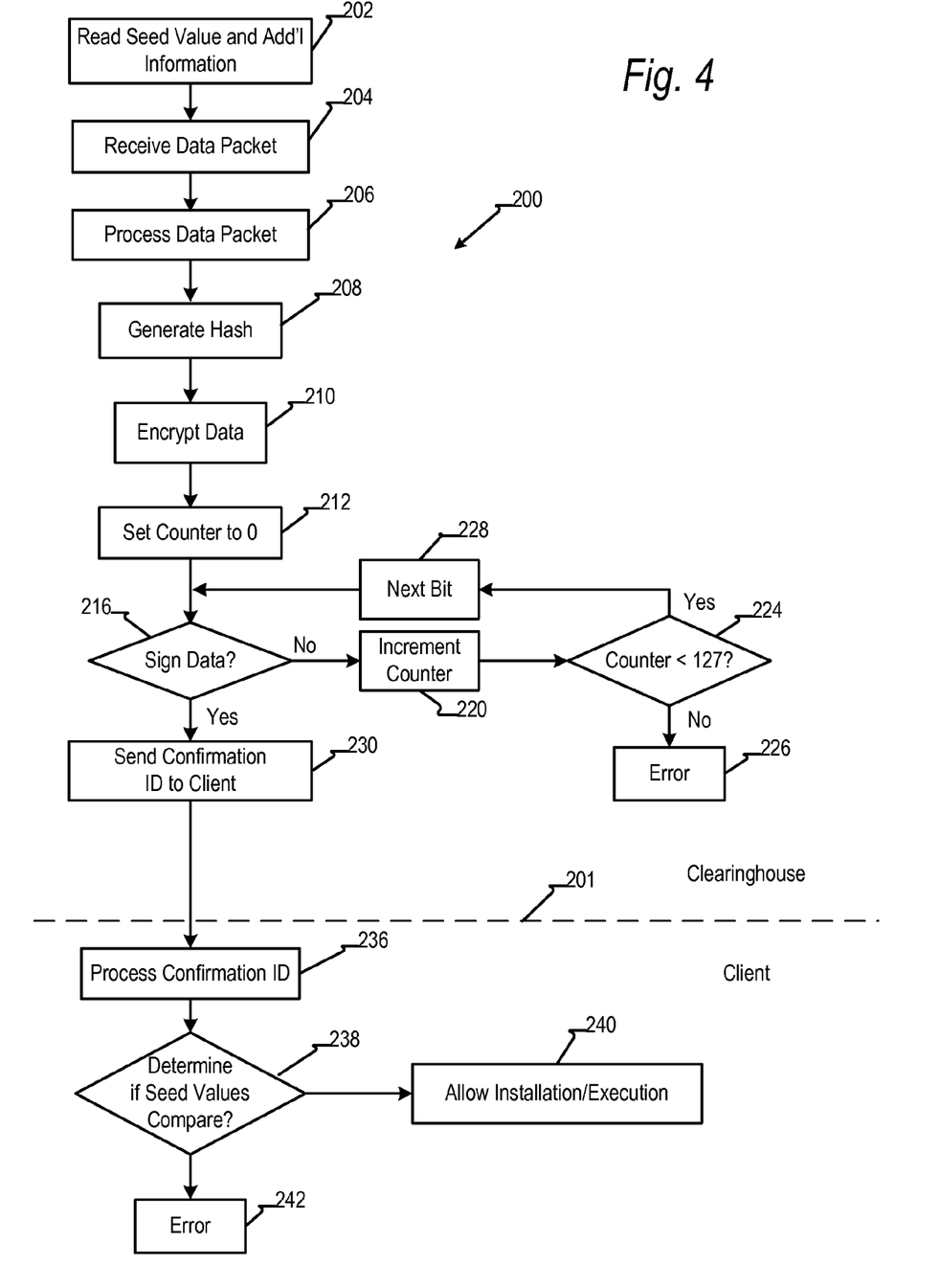
FIG. 4 is a flow diagram of an embodiment of a process for generating and reversing a reversible hash to authenticate a software license.

A method 200 for generating and reversing a hash is shown in FIG. 4. In embodiments, part of the method 200 is executed at the clearinghouse server 102 and part of the method 200 is executed at the client 100, as represented by line 201. Embodiments of the present system relate to the operations performed at the clearinghouse server 102. In step 202, the seed value 110 and additional information 112 are read by the server 102 from memory (from media or within a buffer in server 102). In step 204, the server 102 receives the data packet 106 from client 100. The data packet 106 may also be communicated, over a telephone, to a vendor at the clearinghouse 102 and entered into the clearinghouse 102. In step 206, the data packet is processed as described above to obtain root data 105.

In embodiments, the hash algorithm component 109 executes one or more functions to create the hash 114 in step 208. For example, the hash algorithm component 109 performs the logic operation XOR, which is a binary logic operation completed on the seed value or interim hash and a partition of the software or other data. The XOR operation produces a one (1) if the bit in the seed value or interim hash and the complimentary bit in the partition of the software or other data are both zero (0). Other operations of functions, e.g., add, subtract, divide, rotate, shift, etc., are possible and contemplated. The product of the function or operation, performed by the hash algorithm component 109, is another interim hash or the final hash 114. If the product is an interim hash, the hash algorithm component 109 may complete another iteration of the same function or operation or complete different functions or operations using another partition of software or other data and the interim hash. Once the predetermined number of functions or operations are completed, the hash algorithm component 109 provides the final reversible hash 114.

In embodiments, the encryption engine 116 encrypts the reversible hash 114 in step 210 to create the confirmation ID 118. In steps 212 through 228, the server 202 attempts to sign the encrypted confirmation ID. In particular, in step 212, a counter is initialized to zero. In step 216, attempt is made to sign the encrypted value using the private key of the vendor. The signing can involve a bit-by-bit comparison. In embodiments, the confirmation ID 118 may be 128 bits. Therefore, if the signing step 216 fails, the counter is incremented in step 220 and a check is done in step 224 to see if the last bit has been examined. In embodiments, the confirmation ID may be more or less than 128 bits. In such embodiments, the counter would be adjusted accordingly. If the last bit has been examined in step 224 and the confirmation ID has not been successfully signed, the user is notified of an error in generating the confirmation ID in step 226.

If less than all of the bits have been examined in step 224, the next bit is examined in step 230 and the server again attempts to sign the confirmation ID in step 216. If the confirmation ID is successfully signed in step 216, the signed confirmation ID 118 is relayed to the client 100 in step 230. As indicated, the confirmation ID 118 may be related vocally by a customer service representative of the vendor or by a voice recognition system.

Although not forming part of the present system in embodiments, once at the client, the client processes the confirmation ID 118 as explained above in step 236. These processing steps involve a decryption of the confirmation ID to obtain the root data, and a reverse hash of the operation to obtain a determined seed value. In step 238, the determined seed value is compared against the stored seed value. If the determined and stored seed values match, the product is activated and installation of the software product proceeds in step 240. If the determined and stored seed values do not match, the user is notified of an installation error in step 242 and the installation of the software product does not proceed.

Figure 5:
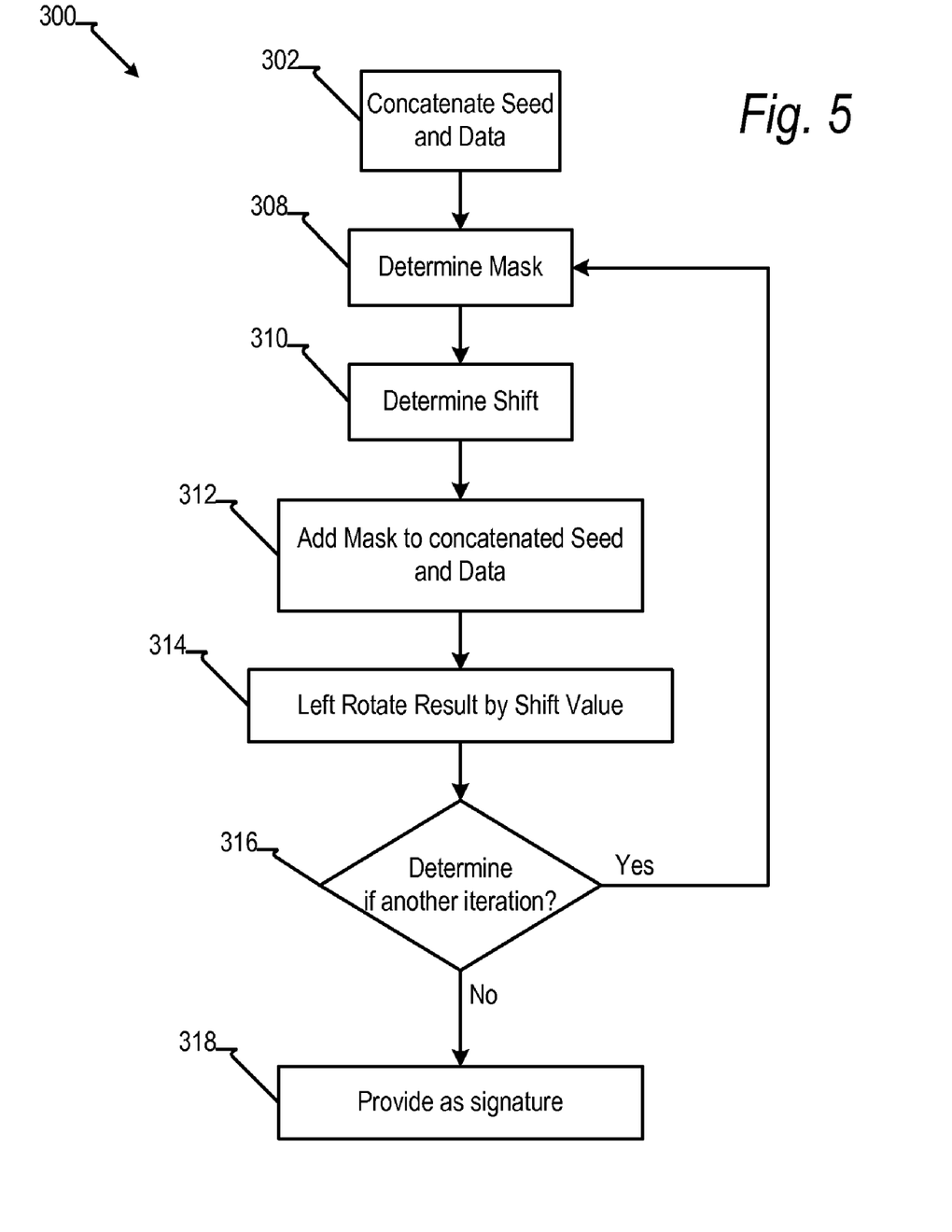
FIG. 5 is a flow diagram of an embodiment of a process for generating a reversible hash to authenticate a software license.

A more detailed exemplary embodiment method 300 for hashing operation step 208 is now explained with reference to the flowchart of FIG. 5 and the exemplary hash pseudo code 500 in FIG. 7. A more detailed exemplary embodiment of a method 400 for the reverse hashing operation in the client is explained hereinafter with respect to the flowchart of FIG. 6 and the associated exemplary reverse hash pseudo code 600 in FIG. 8. In step 302, two inputs to the hash algorithm component 109 are concatenated. For example, data 504 (FIG. 7) is provided in the pseudo code 500. In embodiments, the data 504 may be a partition of the software, i.e., a six-bit array "100001" from a predetermined address of memory storing the software. The data 504 may alternatively be the root data 105, in which case it may be a longer bit string. In the example shown in FIG. 7, the seed value 502 is "1100." The seed value 502 may be the same and associated with every software product of the same type.

In the exemplary embodiment, concatenate operation 302, function 506, concatenates the seed 502 and the data 504 to form a data array 508. From the concatenated data 508, determine operation 308 determines a mask. For example, the concatenated seed and data 514 is an input into determining the mask 510. The mask 510, in one embodiment, is a two bit array extracted from the software at a memory address defined by the concatenated seed and data 514. Determine operation 310 determines a shift value. In the exemplary embodiment, the shift value 512 is also determined using the concatenated seed and data 514. The shift value 512 may be the result of the sum of all the bits extracted from the software at a memory address defined by the concatenated seed and data 514.

Add operation 312 adds the mask to the concatenated seed and data as a second function. The binary add function 516 generates an interim hash 518. As is seen in this example, the functions may be mathematical. Left rotate operation 314 rotates the interim hash by the number of bits specified by the shift value. For example, the first 5 bits 524 specified from the shift value 512 are moved from the front of the bit array 518 to the five bits 526 of bit array 522. As is shown in this example, the function may also be a bit operation. The bit array 522 is the next interim hash.

Determine operation 316 determines if another iteration of the function is required. In one embodiment, the same functions are performed successively for a predetermined number of iterations. Different functions may also be performed in subsequent operations. If there is another iteration, the process 300 flows YES to determine operation 308. As shown generally at 528, another iteration of an addition and a right rotate are completed. If there is not another iteration, the process 300 flows NO to provide operation 318. Provide operation 318 provides a signature. In an embodiment, the final hash value 530 is encrypted and communicated to a client.

Figure 6:
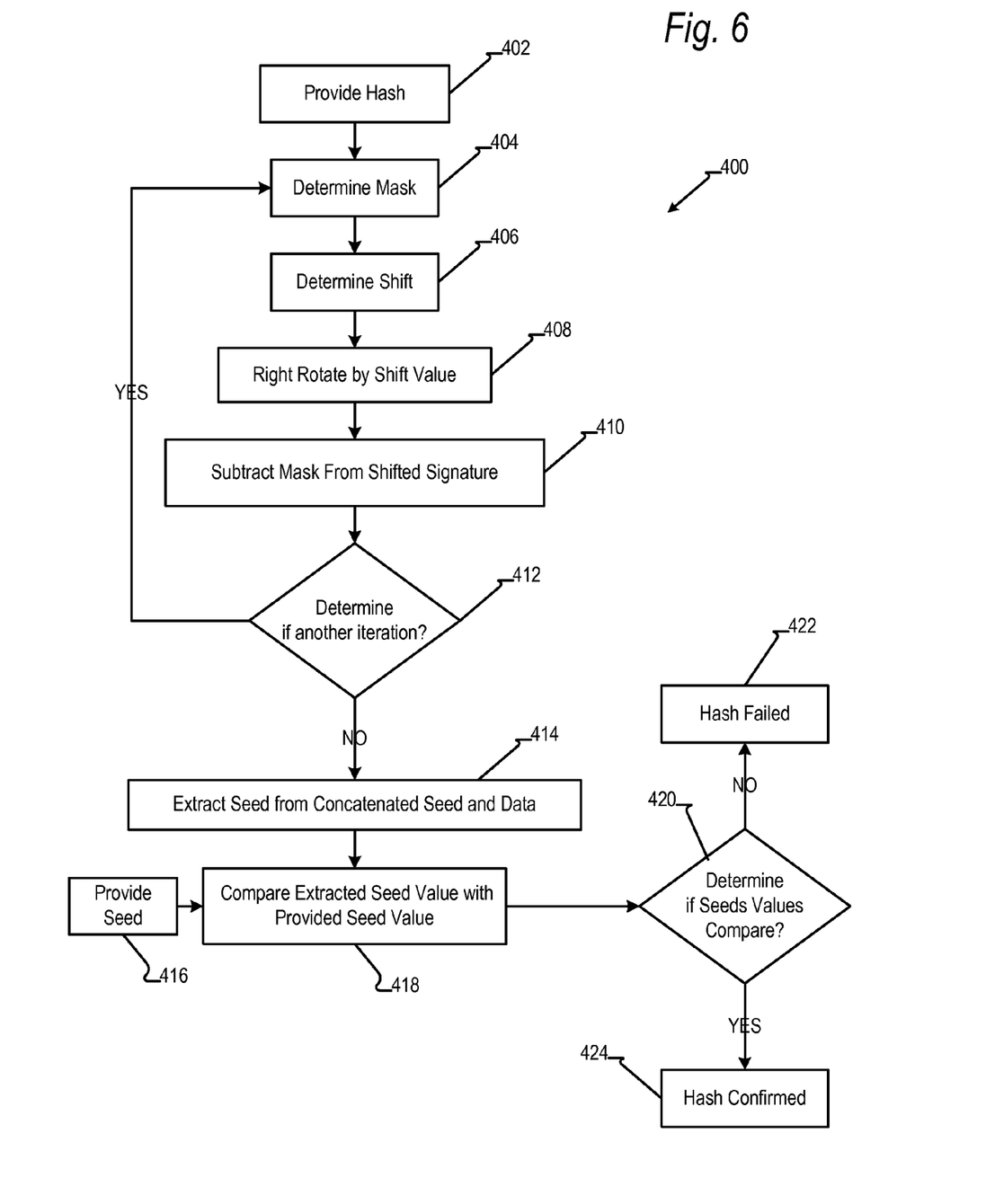
FIG. 6 is a flow diagram of an embodiment of a process for reversing the reversible hash generated by the process shown in FIG. 5.
Figure 7:
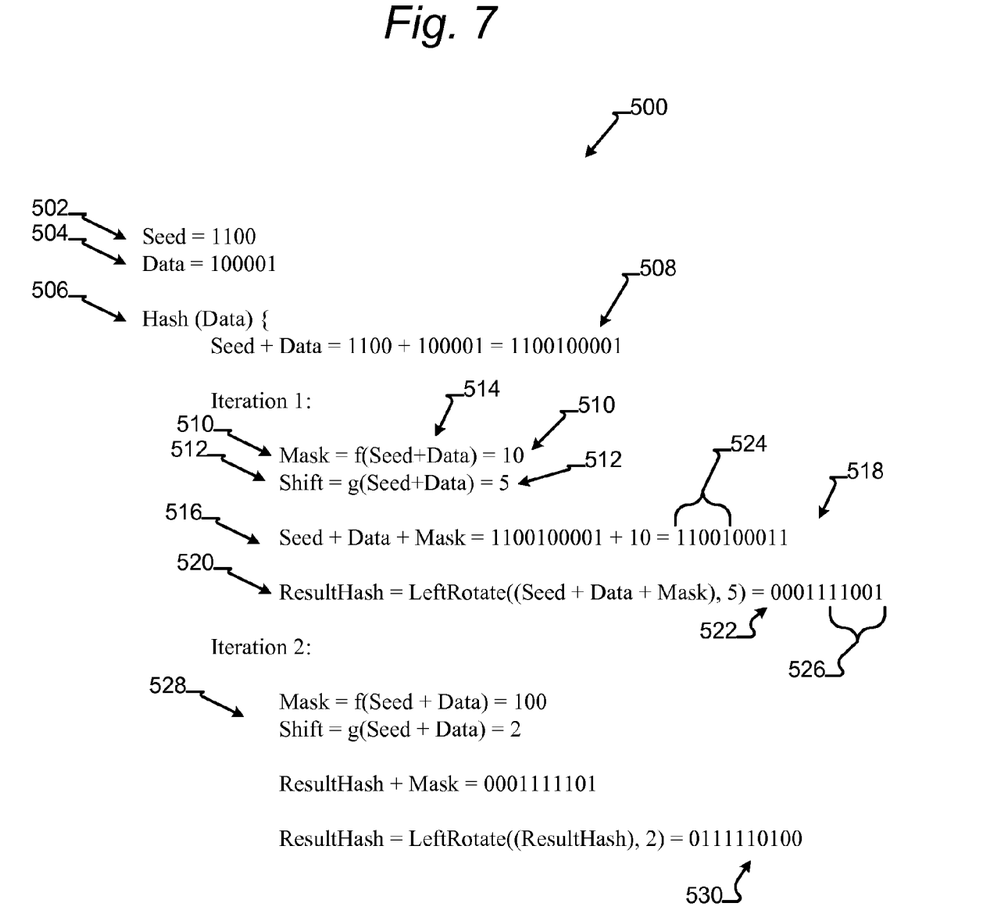
FIG. 7 is an embodiment of pseudo code for generating a reversible hash associated with the process shown in FIG. 5.
Figure 8:
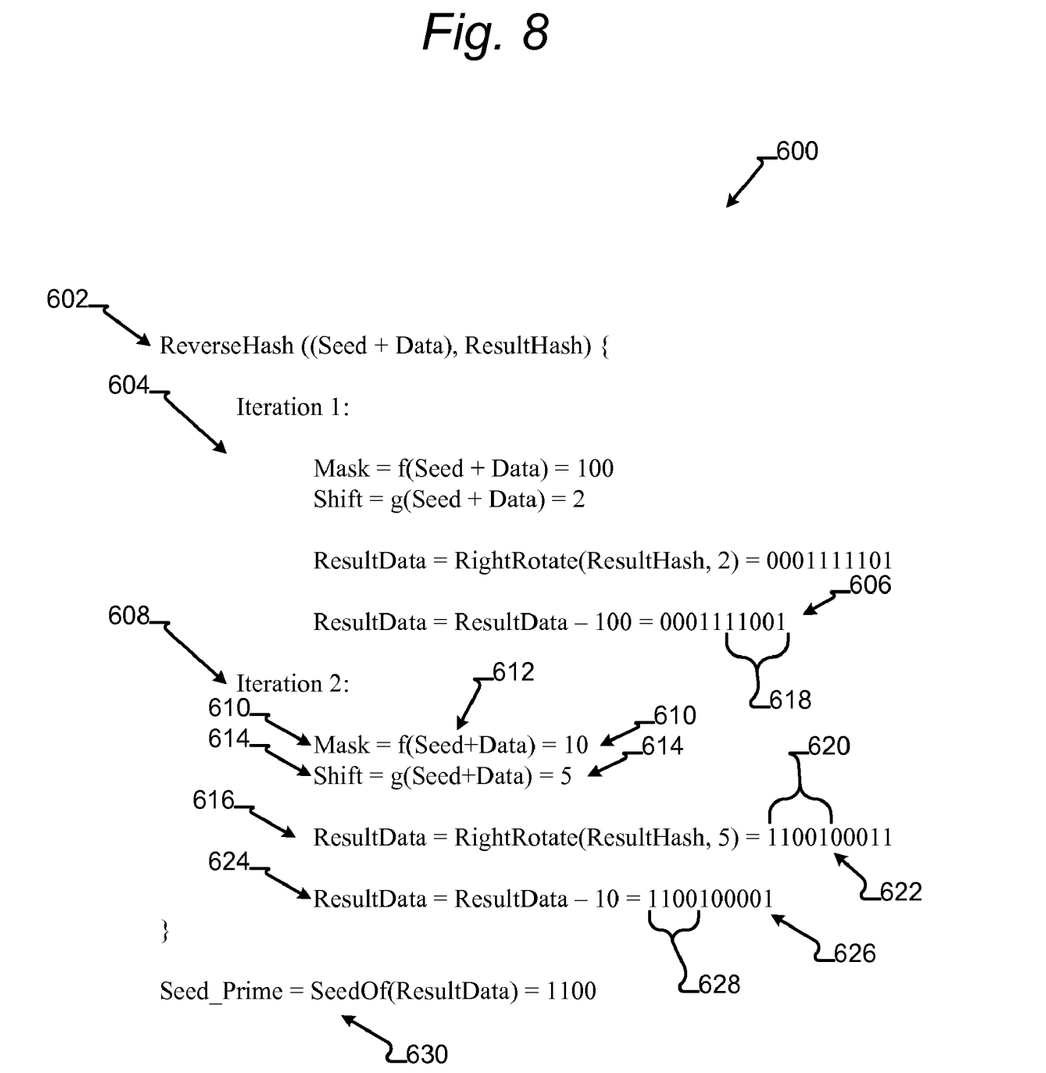
FIG. 8 is an embodiment of pseudo code for reversing the reversible hash associated with the process shown in FIG. 6.

The process 400 for reversing the hash 530 is shown in FIG. 6 with associated exemplary pseudo code 600 shown in FIG. 8. Provide operation 402 provides the reversible hash. In one embodiment, the confirmation ID sent to the client is decrypted to extract the reversible hash 530 (FIG. 7). The hash 530 may be the first operand in a reverse hash algorithm 602 (FIG. 8). A first iteration of functions 604, in embodiments, reverses the second iteration 528 of functions in the hash algorithm 500. The first iteration 604 of the functions produces an interim hash 606. A second iteration 608 of the functions further "unwinds" the interim hash 606 and reverses the first iteration of functions 516 and 520 in the hash algorithm 500. The method 400 shown in FIG. 4 will be explained with reference to the second iteration 608 shown in FIG. 6.

Determine operation 404 determines the mask. In embodiments, the mask is determined with a function that uses the seed and a selection of data as its input. For example, the mask 610 uses a concatenated seed value and data selection 612 to determine the mask 610. The concatenated seed value and data selection 612, in embodiments, is the same as the concatenated seed and data input 514 in the mask 510 of the hash operation 500. Thus, the same mask is determined as evidenced by the same value for mask 610 and mask 510. It should be noted that if the software is different, then the data used to determine the mask 610 may be different. As such, the hash would not reverse correctly, and the authorization of the license would fail.

Determine operation 406 determines the shift value. In embodiments, the shift value 614 would be determined the same as the shift value 512. Again, it should be noted that if the software is different, then the data used to determine the shift value 614 may be different. As such, the hash again would not reverse correctly, and the authorization of the license, built on the correct seed value being determined, would fail.

Right rotate operation 408 rotates the interim hash by the number of bits specified in the shift value. As can be seen by the exemplary embodiment 600, the right rotate operation 616 reverses or is the counter function to the left rotate function 520. In addition, the right rotate operation 616 is performed first before other functions because the left rotate function 520 was performed last after all other functions. Thus, the counter functions performed in the reverse hash method 600 reverse the functions in the hash method 500 and occur in the opposite order of the hash method 500. Right rotate operation 616 moves, bit-by-bit, the last five bits 618 of the interim hash 606 to the front five bits 620 of the bit array 622. From this example, it can be seen that the output of this counter function 616 is the same as the input 518 of the corresponding left rotate function 520 in the hash method 500. In other words, the right rotate function 616 reversed the left rotate function 520. The right rotate operation 408 produces another interim hash 622.

Subtract operation 410 subtracts the mask from the interim hash 622. In embodiments, the subtract function 624 subtracts the mask 610 from the interim hash 622. The function 624 produces another interim hash 626. As with the right rotate operation 408, the subtract operation 624 is the counter to and reverses the add operation 516. As such, the result of the subtract function 624 is the same as the input 508 into the add operation 516.

Determine operation 412 determines if there is another iteration. The number of iterations, in embodiments, is predetermined and is the same for the hash operation 500 and the reverse hash operation 600. If there is another iteration, the process 400 flows YES to determine operation 404. If there is no other iteration, the process flows NO to extract operation 414. Extract operation 414 extracts the determined seed from the interim hash, which is the concatenated seed and data. As with the concatenated seed and data 508, the seed value is the first four bits 628 of the interim hash 626. The seed value 628 is partitioned and separated from the interim hash 626.

Provide operation 416 provides the known seed value. The software product the client desires to install or execute, in embodiments, includes the known seed value 502 used by the clearinghouse 102 to create the final hash 530. For example, the seed value is stored as part of the data or code of the software at a known, predetermined memory address in the software. The known seed value 502 is provided to the compare operation 418. Compare operation 418 compares the provided seed value with the extracted, determined seed value. In the exemplary embodiment, the compare operation 630 compares the extracted seed value 628 to the provided seed value 502.

Determine operation 420 determines if the seed values compare. If the seed values do compare, the process 400 flows YES to hash confirmed operation 424. If the seed values do not compare, the process 400 flows NO to hash failed operation 422. Hash failed operation 422 fails if the hashes do not compare. In embodiments, an error message is produced and/or the software fails to install or execute. Hash confirmed operation 424 confirms the hash. For example, an authorization is produced to continue or complete the software installation or to execute the software.

One skilled in the art will recognize that the embodiments described in FIGS. 5 through 8 are not meant to be limiting in nature. Other functions, order of the functions, number of iterations and other changes are possible. In other embodiments, the hash algorithm is an MD5 algorithm completed twice without an XOR of the hash and the data. Likewise, the reverse hash algorithm reverses the MD5 algorithm used to create the hash.

Figure 9:
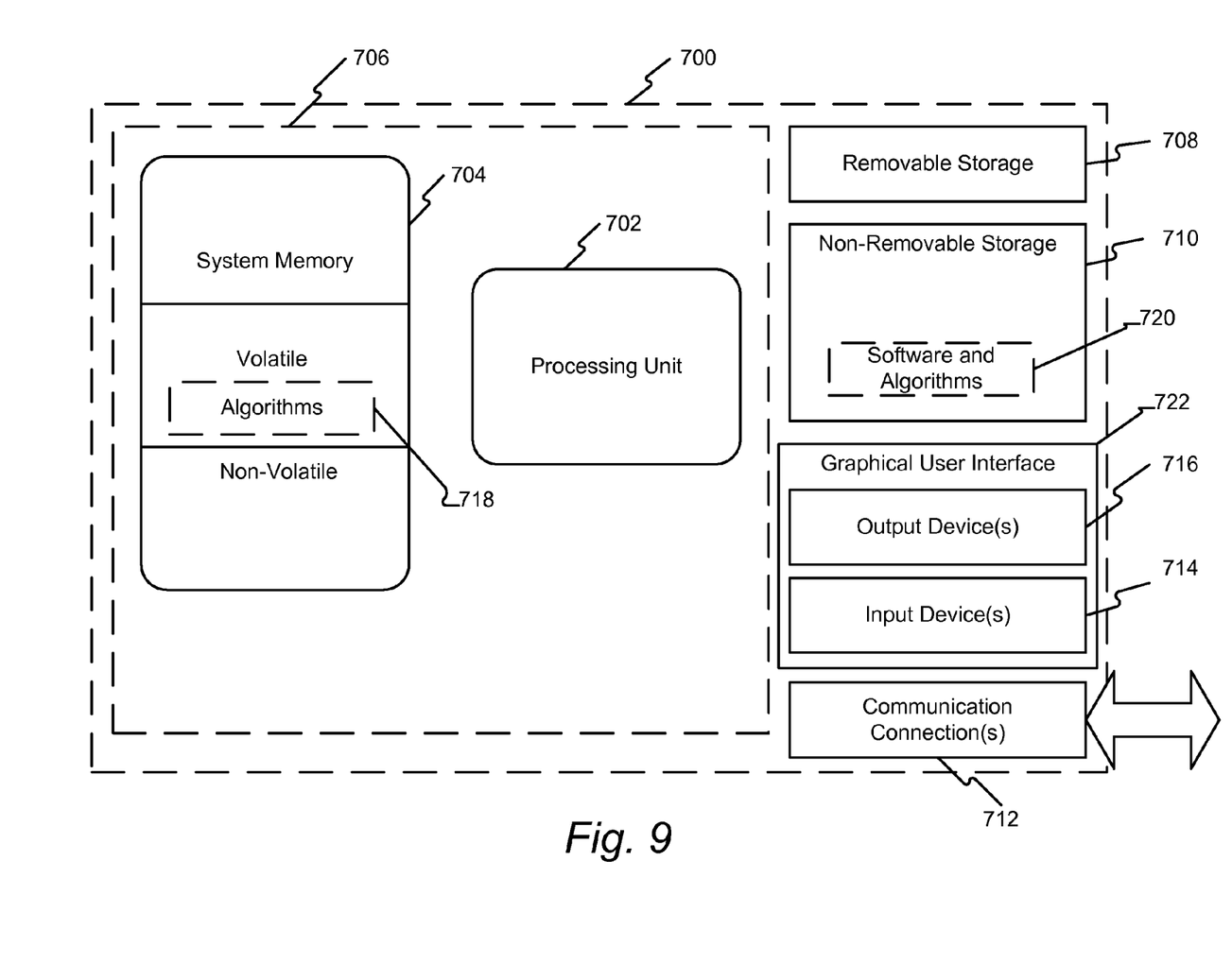
FIG. 9 is a block diagram of an embodiment of a computing system operable for generating reversible hashes or for reversing the reversible hash of a software license.

With reference to FIG. 9, an embodiment of a computing environment for implementing the embodiments described herein is shown. In one embodiment, the clearinghouse 102 is a server at a software vendor's facility while the client 100 is a server, desktop, laptop, handheld device, or other computing system executing software for the customer. Embodiments of the computer environment for the clearinghouse and the client include a computer system, such as computer system 700. In one embodiment, the client computer desires to install or execute a software product 113, while the hash algorithm component 109 executes on a server and sends a confirmation ID that authorizes the installation of the software product 113. As such, a basic computer system applicable to both of these environments is described hereinafter.

In its most basic configuration, computer system 700 typically includes at least one processing unit 702 and system memory 704. In embodiments, either a hash algorithm component or reverse hash algorithm component, generally indicated by 718, is loaded into and run by the processing unit 702 from system memory 704 of either a clearinghouse or a client computer. Depending on the exact configuration and type of computer system 700, memory 704 may be volatile (such as RAM), non-volatile (such as ROM, flash memory, etc.), or some combination of the two. This most basic configuration of the computer system 700 is illustrated in FIG. 9 by dashed line 706.

Additionally, device 700 may also have additional features/functionality. For example, device 700 includes additional storage (removable and/or non-removable) including, but not limited to, magnetic or optical disks or tape. Such additional storage is illustrated in FIG. 9 by removable storage 708 and non-removable storage 710. In embodiments, a hash algorithm component or reverse hash algorithm component, software to be installed, data, or seed values, generally indicated by 720, are stored in non-removable storage 710, although the hash hash algorithm component or reverse hash algorithm component, software to be installed, data, or seed values 720 may be saved into removable storage 708, and loaded into system memory 704 for use by or for execution by the processing unit 702 on the clearinghouse or client. In some embodiments, the hash algorithm component or the reverse hash algorithm component, software to be installed, data, or seed values 720 are one of several components of a software license authentication system. Computer storage media includes volatile and nonvolatile, removable and non-removable media implemented in any method or technology for storage of information such as computer readable instructions, data structures, program modules, or other data.

Memory 704, removable storage 708, and non-removable storage 710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, for example, the software product data 113 or the seed values 110, and which is accessed by device 700 and processor 702 on either the clearinghouse or the client computer. Any such computer storage media may be part of device 700.

Device 700 may also contain communication connection(s) 712 that allow the device to communicate with other devices. In embodiments, the communication connections 712 are used to send and/or receive data packets 106, and send and/or receive confirmation IDs 118 with a service executed on both the clearinghouse server and the client that is accessed over a network, such as the Internet. Communication connection(s) 712 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

In embodiments, device 700 includes a graphical user interface 722 that includes input devices 714 and output devices 716. Data selections for the data packet 106, in embodiments, are selected with user input device(s) 714, and the data 106 are displayed with output device(s) 716. Input device(s) 714 are also referred to as user interface selection devices and include, but are not limited to, a keyboard, a mouse, a pen, a voice input device, a touch input device, etc. Output device(s) 716 are also referred to as displays and include, but are not limited to, cathode ray tube displays, plasma screen displays, liquid crystal screen displays, speakers, printers, etc. These devices, either individually or in combination, form the graphical user interface 722 used to display data as described herein. All these devices are well known in the art and need not be discussed at length here.

Computer system 700 typically includes at least some form of computer readable media. Computer readable media can be any available media that can be accessed by processing unit 702. By way of example, and not limitation, computer readable media comprise computer storage media and communication media. Software license systems and the algorithms 718 comprise such modules or instructions executable by computer system 700 that may be stored on computer storage medium and other tangible mediums and transmitted in communication media. Computer storage media includes volatile and nonvolatile, removable and non-removable media implemented in any method or technology for storage of information such as computer readable instructions, data structures, program modules, or other data. Combinations of any of the above should also be included within the scope of computer readable media.

In some embodiments, computer system 700 is part of a network that stores data in remote storage media for use by the computing system 700. In embodiments, a reverse hash algorithm 718 executing on a client system may access the remotely stored data, for example, the known seed value, to compare seed values. In other embodiments, the computing system 700 is a desktop or similar computer that stores and operates the reverse hash algorithm 718 on local client data stored in a local storage medium. In still other embodiments, the reverse hash algorithm 718 is executed remotely on a server computer system, wherein compare results are returned to a client computer system but not generated on the client computer system.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A computer implemented method of authenticating a license for the use of a software product, the method comprising the steps of:
   (a) providing the software product, the software product initially being un-authenticated and incapable of being used without authentication;
   (b) verbally receiving an installation ID from a user attempting to authenticate the software product, the verbal installation ID received by a human representative associated with an authentication server;
   (c) forming a reversible hash from two or more of a first data string, a second data string and a third data string via a hashing algorithm, the first data string in part obtained from the installation ID verbally received in said step (b), the second data string being data included in the software product, and the third data string being data associated with the software product;
   (d) concatenating the reversible hash formed in said step (c) to the first data string;
   (e) encrypting the concatenated hash and first data string formed in said step (d);
   (f) signing the encrypted string formed in said step (e) using a digital key;
   (g) outputting from the authentication server the signed and encrypted string for forwarding to a client device as a confirmation ID for activating the software product; and
   (h) transforming the un-authenticated software product to an authenticated software product which may be used upon entry of the confirmation ID output in said step (g).

2. The method recited in claim 1, wherein said step (c) of forming a reversible hash from two or more of a first data string, a second data string and a third data string comprises the step of retrieving the second and third data strings from memory in the authentication server.

3. The method recited in claim 1, wherein the third data string in said step (c) is information relating to the software license.

4. The method recited in claim 1, wherein the first data string in said step (c) is includes root data used to form the installation ID, the root data including a product ID that is unique to the software product, and a hardware ID related to the client device.

5. The method recited in claim 1, wherein the second data string in said step (c) is information relating to a seed value.

6. The method of claim 5, wherein the software product is an instance of multiple copies of the software product, the seed value is an identifier that is common to the multiple copies of the software product.

7. A computer-readable storage medium capable of programming a processor to perform a method of authenticating a license for the use of a software product, the method comprising the steps of:
- (a) verbally receiving an installation ID from a user attempting to authenticate the software product, the verbal installation ID received by a human representative associated with an authentication server;
- (b) generating a first data string from the installation ID received from a client device where attempt to authenticate the software product is being made;
- (c) retrieving from memory of the authentication server at least one second data string, the at least one second data string including a data string that is a seed value included in the software product;
- (d) forming a reversible hash from the first data string and the at least one second data string via a hashing algorithm;
- (e) concatenating the reversible hash formed in said step (d) to the first data string;
- (f) encrypting the concatenated hash and first data string formed in said step (e);
- (g) outputting from the server the encrypted string for forwarding to the client device as a confirmation ID for activating the software product; and
- (h) activating the software product using the confirmation ID.

8. The computer-readable storage medium recited in claim 7, wherein said step (b) of generating a first data string from the received installation ID further comprises the step of processing the installation ID, said step of processing the installation ID including the step of decrypting the installation ID using a private key corresponding to a public key used to encrypt the installation ID at the client.

9. The computer-readable storage medium recited in claim 7, wherein the software product is one of multiple copies of the software product, the seed value is common to all of the multiple copies of the software product.

10. The computer-readable storage medium recited in claim 7, wherein said step (c) of retrieving from memory at least one second data string comprises the step of retrieving from memory information relating to the license for the software product in addition to the seed value.

* * * * *